United States Patent [19]

Dickirson

[11] Patent Number: 5,039,138

[45] Date of Patent: Aug. 13, 1991

[54] CABLE JOINING ASSEMBLY AND METHOD FOR JOINING CABLES

[75] Inventor: Gene D. Dickirson, Garden City, Mich.

[73] Assignee: Ford Motor Company, Dearborn, Mich.

[21] Appl. No.: 485,391

[22] Filed: Feb. 26, 1990

[51] Int. Cl.$^5$ .............................................. F16L 37/00
[52] U.S. Cl. .................................. 285/314; 74/502.5; 74/502.6; 403/316; 403/287
[58] Field of Search ................ 74/502.4, 502.5, 502.6, 74/500.5, 501.5; 285/82, 115, 116, 305, 330, 921; 403/23, 341, 194, 195, 316, 287

[56] References Cited

U.S. PATENT DOCUMENTS

| | | |
|---|---|---|
| 1,385,178 | 2/1921 | Levedahl . |
| 2,021,241 | 12/1934 | Mall ............................ 255/64 |
| 2,110,397 | 1/1937 | Kangas .......................... 285/193 |
| 2,270,926 | 1/1942 | Briegel et al. .................. 285/193 |
| 2,567,727 | 9/1951 | Quackenbush ................... 173/363 |
| 2,886,355 | 5/1959 | Wurzel .......................... 287/52 |
| 3,097,871 | 7/1963 | McNally ........................ 287/117 |
| 3,120,966 | 2/1964 | Lyon ............................ 285/116 |
| 3,245,703 | 4/1966 | Manly ........................... 285/319 |
| 3,279,835 | 10/1966 | Krohm .......................... 287/119 |
| 3,298,723 | 1/1967 | Damm ........................... 287/119 |
| 3,314,696 | 4/1967 | Ferguson et al. ................ 285/193 |
| 3,347,293 | 10/1967 | Clark ........................... 145/50 |
| 3,367,692 | 2/1968 | Balian .......................... 287/103 |
| 3,390,589 | 7/1968 | Tschanz ........................ 74/502.4 |
| 3,450,424 | 6/1969 | Calisher ...................... 137/614.03 |
| 3,528,312 | 9/1970 | Nielsen ........................ 74/502.4 X |
| 3,552,775 | 1/1971 | Warner ......................... 287/91 |
| 3,574,362 | 4/1971 | Gregg et al. ................... 285/321 |
| 3,584,902 | 6/1971 | Vyse ............................ 285/305 |
| 3,625,551 | 12/1971 | Branton et al. ................. 285/305 |
| 3,810,073 | 5/1974 | Zajac et al. ................... 285/319 X |
| 3,881,753 | 5/1975 | Bochory ........................ 285/92 |
| 3,922,011 | 11/1975 | Walters ........................ 285/277 |
| 3,973,791 | 8/1976 | Porta et al. ................... 285/305 |
| 4,009,896 | 3/1977 | Brewer ......................... 285/305 |
| 4,059,295 | 11/1977 | Helm ........................... 285/305 |
| 4,063,760 | 12/1977 | Moreiras ....................... 285/305 |
| 4,126,338 | 11/1978 | Coel et al. .................... 285/305 |
| 4,194,765 | 3/1980 | Reddy .......................... 285/305 |
| 4,198,080 | 4/1980 | Carpenter ...................... 285/305 |
| 4,219,222 | 8/1980 | Brusadin ....................... 285/305 |
| 4,220,361 | 9/1980 | Brandenberg .................... 285/323 |
| 4,226,445 | 10/1980 | Kramer ......................... 285/323 |
| 4,244,608 | 1/1981 | Stuemky ........................ 285/323 |
| 4,266,814 | 5/1981 | Gallagher ...................... 285/323 |
| 4,541,658 | 9/1985 | Bartholomew .................... 285/319 |
| 4,682,513 | 7/1987 | Reeder ......................... 74/502.4 X |
| 4,854,185 | 8/1989 | Lightenberg et al. ............. 74/502.9 X |
| 4,884,468 | 12/1989 | Muramatsu et al. ............... 403/316 |
| 4,917,418 | 4/1990 | Gokee .......................... 74/502.6 X |

FOREIGN PATENT DOCUMENTS

| | | |
|---|---|---|
| 359717 | 4/1906 | France ......................... 74/502.6 |
| 780002 | 4/1935 | France ......................... 74/502.6 |
| 319710 | 9/1929 | United Kingdom . |

*Primary Examiner*—Randolph A. Reese
*Assistant Examiner*—Timothy Aberle
*Attorney, Agent, or Firm*—Randolph A. Smith; Clifford L. Sadler

[57] ABSTRACT

A cable joining assembly (20) for easily joining push-pull and torsional cables by a hand assembly operation and without the use of tools is disclosed as comprising a first conduit section (22) and a second conduit section (26). First and second slide wires (24, 28) are relatively movable within respective first and second conduit sections (22, 24). A snap-together mechanism (30) joins the sectins as the relative movement of the first and second slide wires (24, 28) is affixed with respect to the first and second conduits (22, 26) respectively and by joining the first and second conduit sections (22, 24) simultaneously connecting the first and second slide wires (24, 28). Unfixing the relative movement of the slide wires (24, 28) with respect to the conduits (22, 26) allows the slide wires (24, 28) to be movable together and transmit forces thereby within the formed composite conduit.

16 Claims, 5 Drawing Sheets

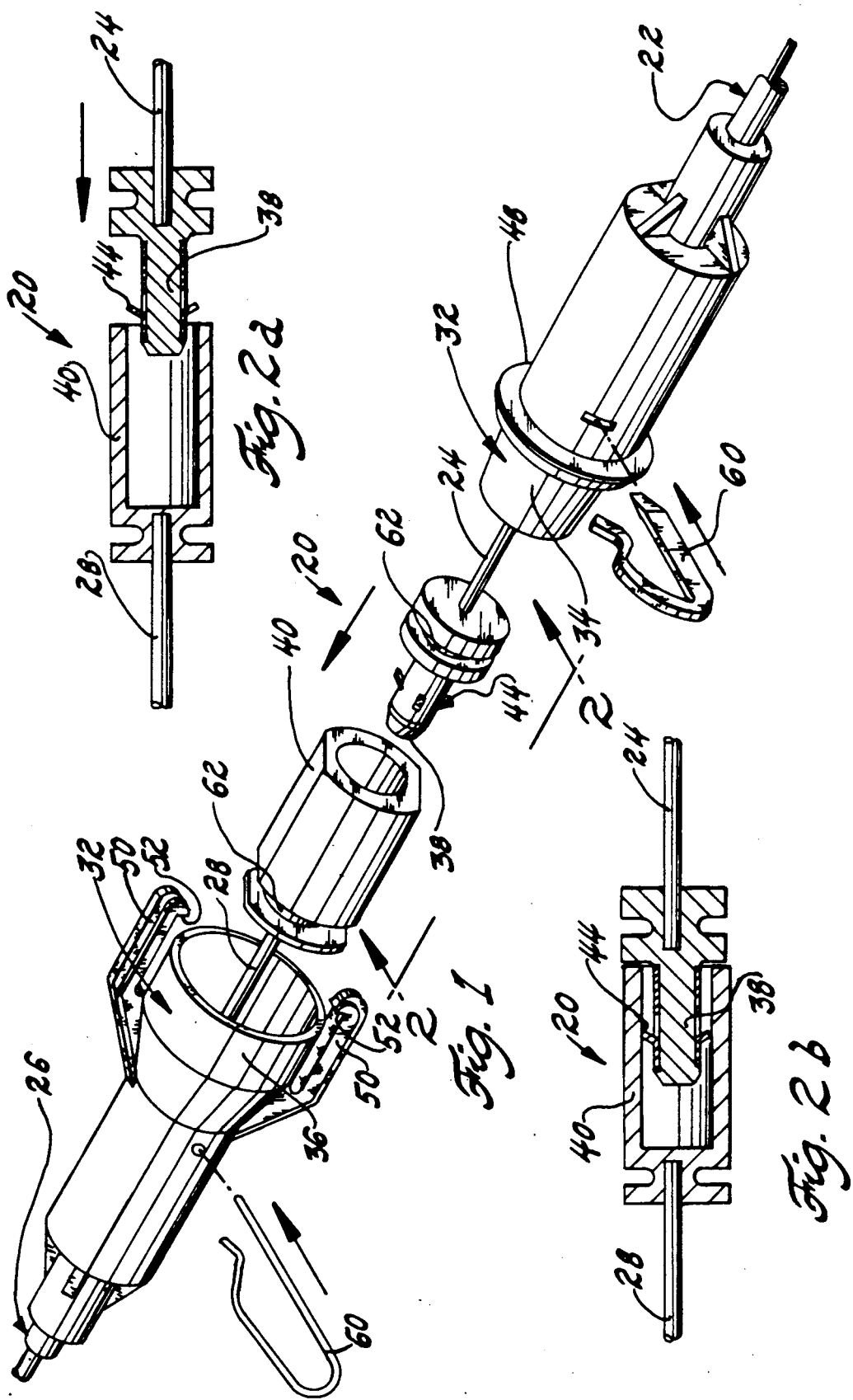

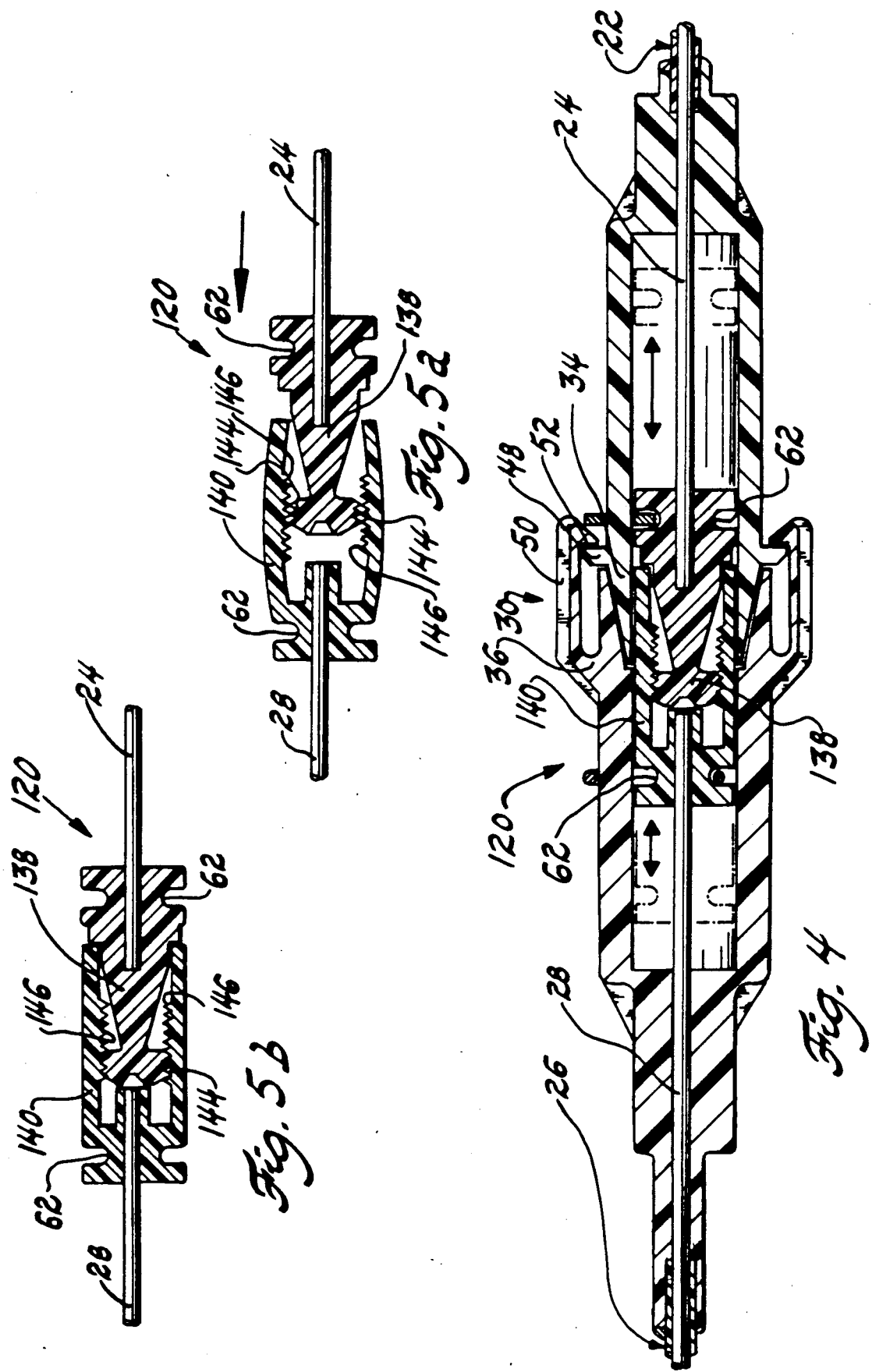

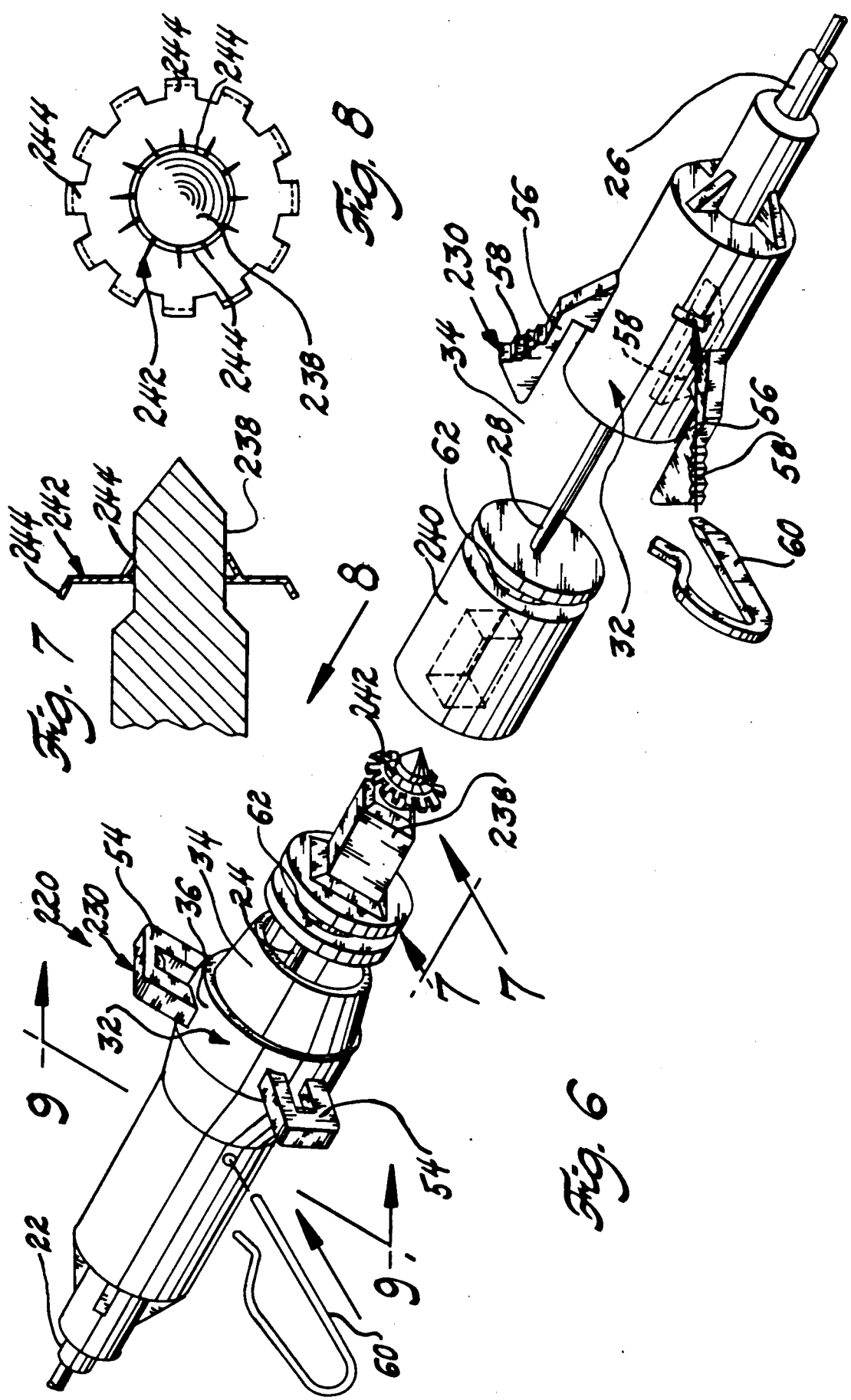

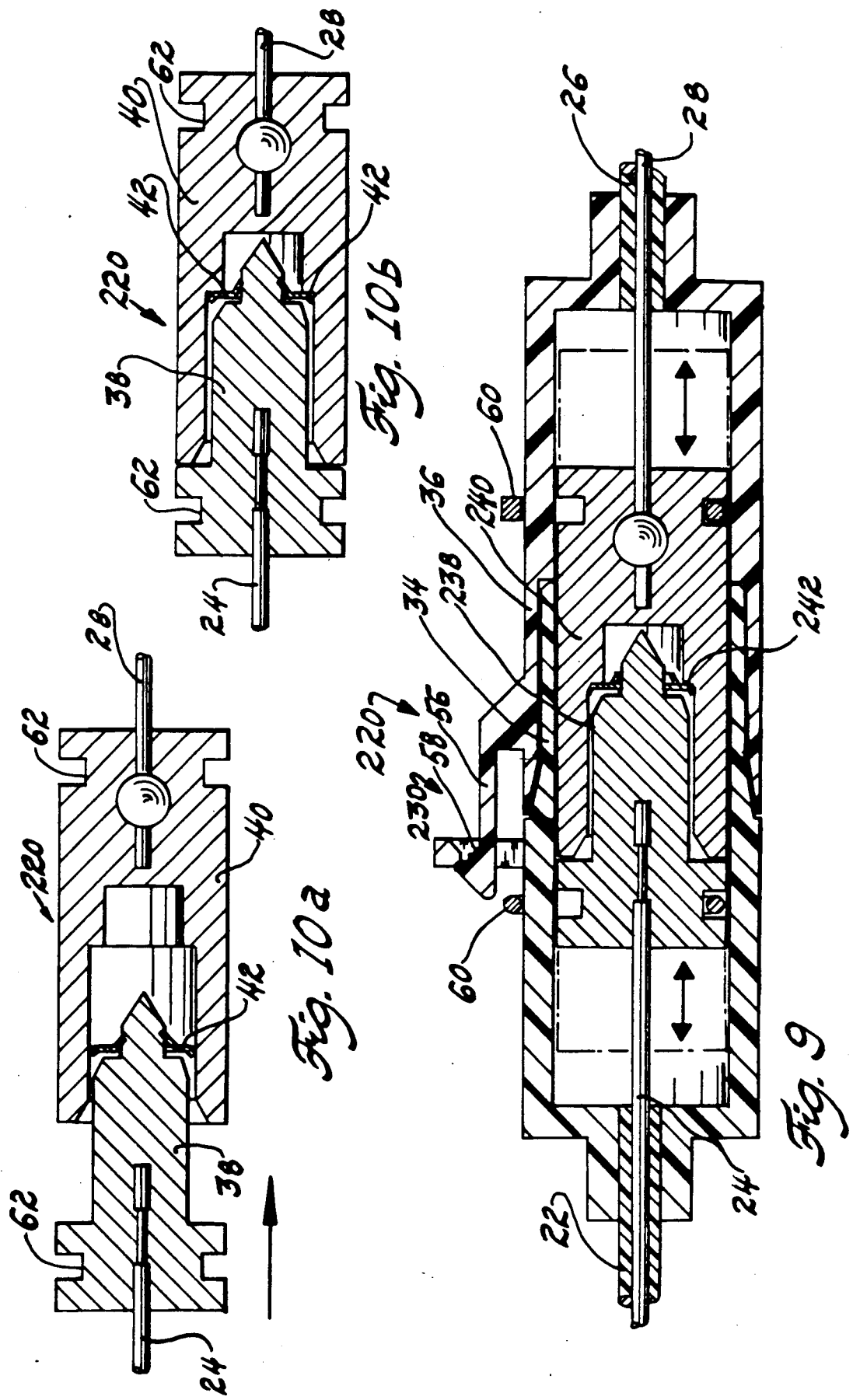

CABLE JOINING ASSEMBLY AND METHOD FOR JOINING CABLES

TECHNICAL FIELD

This invention relates to joining push-pull and torsional cables and, more particularly, to an assembly for easily joining such cables by a hand assembly operation and without the necessity of using other tools.

BACKGROUND ART

Conventional push-pull and torsional slide wire cables are used for transmitting movement or forces along an irregular path. Such cables are used for a variety of applications including, but not limited to, agricultural, automotive, marine, cycle, and lawn and garden. Examples of such cables include engine choking and throttling control applications, transmission shifting applications, vehicle braking applications and various instrumentation applications.

As production emphasis continues to be on systems and components and the communications between the same, these cables continue to become increasingly useful. Cables can become kinked, misrouted and misadjusted if they are not properly installed. The routing of cables is typically compromised due to the need to have access to attach cable ends, one to another. Typically, conventional slide wire cables require a tool equipped skilled operator with knowledge of various methods of attaching and adjusting the cables.

U.S. Pat. No. 3,367,692 discloses a shaft construction for electrical components. Therein, a hairpin shaped retainer spring having leg members is received in a circumferential groove on one shaft and the leg members extend into a cooperating circumferential groove in another shaft joining the shafts.

DISCLOSURE OF INVENTION

An object of the present invention is to provide an assembly for connecting push-pull and torsional cables by a hand assembly operation and without the use of other tools.

Another object of the invention is to provide a cable joining assembly where no operator skill or experience is required to facilitate connection between cable ends.

A further object of the invention is to provide a cable joining assembly by which routing of the cables is not dependent on allowing space for their connection.

A still further object of the invention is to provide a cable joining assembly which ensures a snug joint.

In carrying out the above objects, and other objects of the invention the improved cable joining assembly comprises a first conduit section including a first slide wire therein operable to transmit a force. The first slide wire is relatively movable with respect to the first conduit section. A second conduit section, including a second slide wire therein, is also operable to transmit a force. The second slide wire is relatively movable with respect to the second conduit section.

A snap-together mechanism for joining the sections includes a sheath member defined by a first inner sheath section and a second outer sheath section. The first inner sheath section is secured on one conduit section and the second outer sheath section is secured on the other conduit section. The inner sheath section is cooperatively insertable within the outer sheath section for joining first and second conduit sections against relative axial movement to form a composite conduit.

The snap-together mechanism also includes male and female slide wire end fittings movable within the sheath member. One slide wire end fitting is affixed to an end of the first slide wire and the other slide wire end fitting is affixed to an end of the second slide wire. The male slide wire fitting is insertable into the female slide wire fitting for connecting the first and second slide wires for transmitting a force between the slide wires when the fittings are moving within the sheath member.

The snap-together mechanism further includes a generally radially extending projection. The projection deforms as the male slide wire end fitting is inserted into the female slide wire end fitting for grippingly joining the slide wires together. The projection tends to distend at the end of such insertion into gripping engagement with the female slide wire end fitting to resist relative axial movement between the male and female end fittings. The force required to withdraw the male slide wire end fitting from the female slide wire and fitting is greater than the normal duty cycle force transmitted between the slide wires.

In a first embodiment of the invention, the radially extending projections are affixed with the male slide wire end fitting.

In a second embodiment of the invention, the female slide wire end fitting includes generally radially extending projections complementary with the generally radially extending projections on the male slide wire end fitting. The radially extending projections of the female slide wire end fitting interfit with the radially extending projections of the male slide wire end fitting to lock the end fittings together upon insertion of the male slide wire end fitting into the female slide wire end fitting.

In a third embodiment of the invention, the male and female slide wire end fittings have interfitting shapes which lock the first and second slide wires against relative rotational movement.

In one variation of the invention, one conduit section includes a radially extending flange and the other sheath section includes an extension portion having an inwardly extending annular shoulder for snap-fastening onto the radially extending flange, thereby connecting the conduit sections. In another variation of the invention, one sheath section includes an appended aperture and the other sheath section includes an extension portion having a stepped distal end for snap-fastening onto the appended aperture, thereby connecting the conduit sections in an alternative manner.

The first and second conduit sections are joined by affixing the relative movement of the first slide wire with respect to the first conduit and affixing the relative movement of the second slide wire with respect to the second conduit. The first and second conduit sections are joined together simultaneously connecting together the first and second slide wires. After the joining, the relative movement of the first slide wire with respect to the first conduit is unfixed as is the relative movement of the second slide wire with respect to the second conduit. After the unfixing, the first and second slide wires are movable together. Preferably, the relative movement of the affixed and unfixed slide wires is axial.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a cable joining assembly constructed in accordance with a first embodiment of the present invention;

FIG. 2A is a sectional view, taken along lines 2—2 of FIG. 1 illustrating the positioning of a male slide wire end fitting and a female slide wire end fitting;

FIG. 2B is a sectional view of FIG. 2A illustrating the joined-together arrangement of the male and female slide wire end fittings;

FIG. 4 is a sectional view of the assembly of FIG. 3 illustrating the second embodiment in a joined-together arrangement;

FIG. 5A is a detailed sectional view of a male slide wire end fitting being inserted into a female slide wire end fitting in the second embodiment of the invention;

FIG. 5B is a detailed sectional view similar to FIG. 5A illustrating the fully engaged arrangement of the male and female slide wire end fittings;

FIG. 6 is a perspective view of a cable joining assembly constructed in accordance with a third embodiment of the invention;

FIG. 7 is a sectional view, taken along line 7—7 in FIG. 6 illustrating the male slide wire end fitting having a spring nut thereon;

FIG. 8 is an end view of the male slide wire end fitting and spring nut shown in FIG. 7;

FIG. 9 is a sectional view of the assembly of FIG. 6 illustrating the engaged arrangement of the third embodiment of the invention;

FIG. 10A is a detailed sectional view of the male slide wire end fitting together with the spring nut being inserted into the female slide wire end fitting according to the third embodiment; and FIG. 10B is a detailed sectional view of the male and female slide wire end fittings of FIG. 10A in a fully engaged arrangement.

BEST MODE FOR CARRYING OUT THE INVENTION

Figure 3:
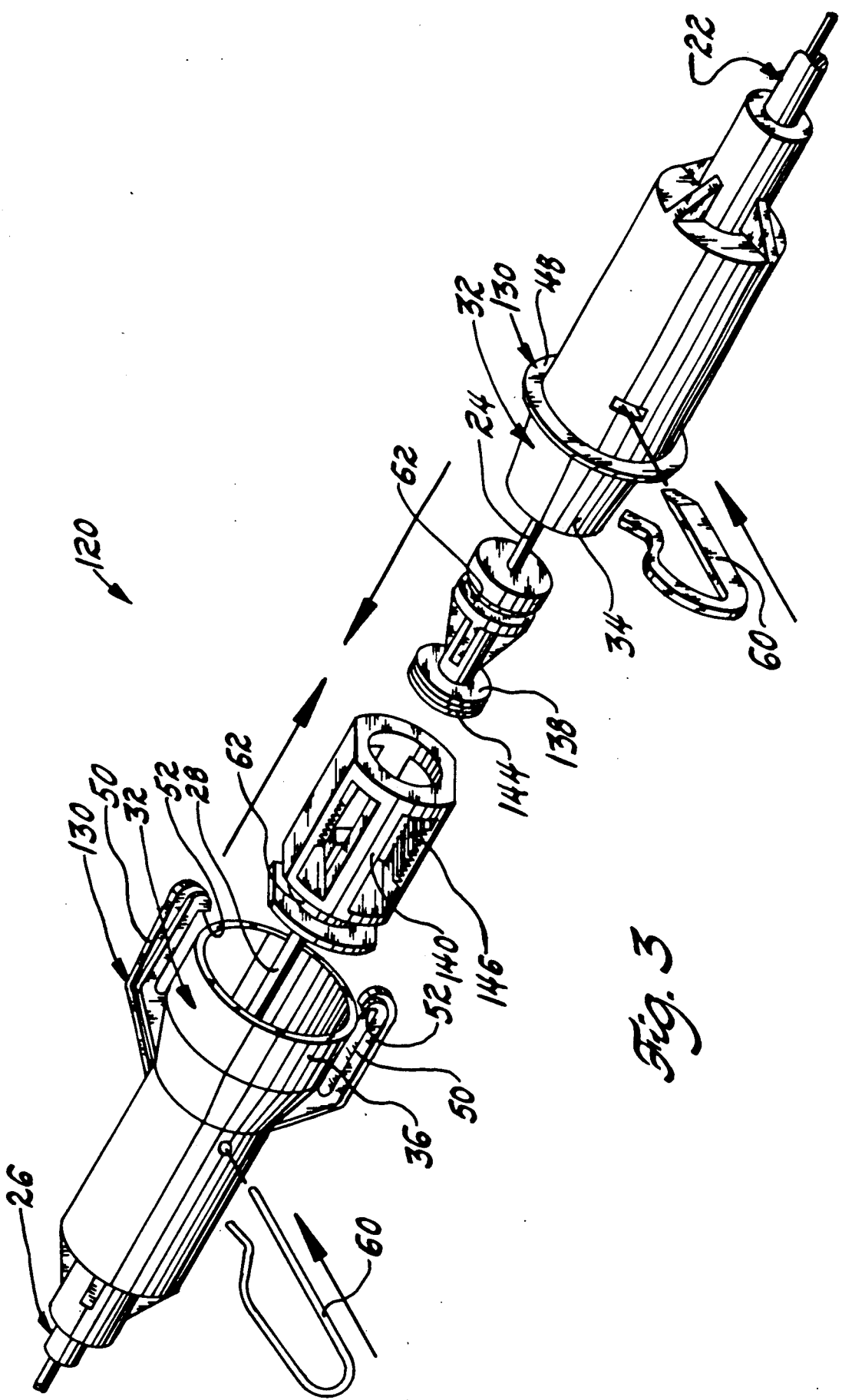
FIG. 3 is a perspective view of a cable joining assembly constructed in accordance with a second embodiment of the invention.

With reference to FIGS. 1, 3 and 6, of the drawings, a cable joining assembly constructed in accordance with the present invention is generally indicated by 20 and is used for joining push-pull and torsional cables without the use of tools. As is more fully hereinafter described, the cable joining assembly 20 requires no operator skill or experience to facilitate connection between cable ends. The cable joining assembly 20 lends itself to a hand assembly operation.

As shown in FIGS. 1, 3 and 6, the cable joining assembly 20 comprises a first conduit section 22 including a first slide wire 24 therein operable to transmit a force. The first slide wire 24 is relatively movable with respect to the first conduit section 22. A second conduit section 26 includes a second slide wire 28 therein operable to transmit a force. The second slide wire 28 is relatively movable with respect to the second conduit section 26.

A snap-together mechanism 30 for joining the first conduit section 22 to the second conduit section 26 includes a sheath member 32 defined by an inner sheath section 34 and an outer sheath section 36. As can be seen, the inner sheath section 34 is secured to one conduit section 22 and the outer sheath section 36 is secured to the other conduit section 26. The inner sheath section 34 is cooperatively insertable within the outer sheath section 36 for joining the first and second conduit sections 22,26 against relative axial movement to form a composite conduit.

The snap-together mechanism 30 also includes a male slide wire end fitting 38 and a female slide wire end fitting 40 movable within the sheath member 32. Male slide wire end fitting 38 is affixed to the end of the first slide wire 24 and the female slide wire end fitting 40 is affixed to the end of the second slide wire 28. The male slide wire end fitting 38 is insertable into the female slide wire end fitting 40 for connecting the first slide wire 24 to the second slide wire 26 for transmitting a force between the slide wires when the fittings are moving within the sheath member 32.

FIGS. 2A and 2B illustrate the before and after connected positions of the male and female slide wire end fittings 38,40. The snap-together mechanism 30 includes generally radially extending projections 44. The projections deform as the male slide wire end fitting 38 is inserted into the female slide wire end fitting 40 for joining the slide wires. The projections 44 tend to distend at the end of such insertion into gripping engagement with the female slide wire end fitting 40 to resist relative axial movement between the male and female end fittings. The force required to withdraw the male slide wire end fitting 38 from the female slide wire end fitting 40 is greater than the normal duty cycle force transmitted between the slide wires.

With continued reference to FIGS. 1, 2A and 2B of the drawings, the radially extending projections 44 are affixed to the male slide wire end fitting 38. FIG. 2A illustrates the male slide wire end fitting 38 having affixed radially extending projections 44 prior to the insertion into female slide wire end fitting 40. FIG. 2B illustrates the post-insertion position of the male slide wire end fitting 38 received within female slide wire end fitting 40. Thereby it can be seen that the radially extending projections 44 deform as the male slide wire end fitting 38 is inserted into the female slide wire end fitting 40 and that the radially extending projections tend to distend at the end of such insertion into gripping engagement with the female slide wire end fitting.

With reference to a second embodiment of the cable joining assembly illustrated in FIGS. 3 through 5B of the drawings, corresponding structure to structure in the first embodiment is referenced by the same reference numerals plus 100. The female slide wire end fitting 140 includes generally radially extending projections 146 complementary with the generally radially extending projections 144 on the male slide wire end fitting 138. As seen in FIG. 4, these radially extending projections 146 interfit with the generally radially extending projections 144 to lock the end fittings together. FIGS. 5A and 5B illustrate the before and after connected positions of the male and female slide wire end fittings 138, 140. As can be seen, the serrated configuration of projections 144, 146 provide more contact surface area at the connection and thusly greater resistance to relative longitudinal displacement.

FIGS. 6 through 10B of the drawings illustrate a third embodiment of the invention wherein corresponding structure to structure in the first embodiment is referenced by the same reference numerals plus 200. Therein the male slide wire end fitting 238 and female slide wire end fitting 240 have interfitting shapes, shown as having a rectangular cross-section. These interfitting shapes lock the first and second slide wires 24,28 against relative rotational movement, thereby allowing the cable joining assembly 220 to be used for transmitting rotational forces as well as translational forces.

In this embodiment, projections 244 are provided by a spring nut 242 having both inwardly and outwardly extending radial projections 244. These projections 244 deform upon insertion of the male end fitting 238 into the female end fitting 240 and thereafter distend causing gripping engagement of the end fittings. In this third embodiment of the invention, spring nut 242 can be mounted on the male slide wire end fitting 238 first, and the combination inserted into the female slide wire end fitting 240 or, alternatively, the spring nut can be inserted into the female slide wire end fitting first and the male slide wire end fitting subsequently inserted into that combination.

With reference again to FIGS. 1 and 3 of the drawings, one sheath section 34 includes a radially extending flange 48 and the other sheath section 36 includes an extension portion 50 having an inwardly extending shoulder 52 for snap-fastening the radially extending flange. In a preferred embodiment of the invention shown in FIG. 6, sheath section 36 incudes an appended aperture 54 and the other sheath section 34 includes an extension portion 56 having a stepped distal end 58 for snap-fastening onto the appended aperture. The stepped distal end 58 allows the sheath section 34, 36 to be snugly fitted and adjusted as the length of the steps provide additional contact points for the attachment.

With further reference to FIGS. 1, 3 and 6 of the drawings, the first conduit section 22, having the first slide wire 24 therein, is joined to the second conduit section 26, having the second slide wire 28 therein, by affixing the relative movement of the first slide wire with respect to the first conduit and the relative movement of the second slide wire with respect to the second conduit through the use of indexing pins 60.

Indexing pins 60 are illustrated as having both a circular cross section and alternatively, a rectangular cross section. Either shape is acceptable and others are possible. Index pins 60 cooperatively engage annular recesses 62 in slide wire end fittings 38,40; 138,140; 238,240. The first and second conduit sections 24,26 are joined by bringing the first and second sheath sections 32,34 together, simultaneously connecting together the first and second slide wire end fittings 38,40, et al while the first and second conduit sections 22,26 are being joined.

In the first and second embodiments of the cable joining assembly 20,120 extension portions 50 engage radially extending flange 48 in a snap-fastening arrangement. In the third embodiment of the assembly 220, stepped distal end 58 of extension portion 50 is insertable into aperture 54 for the snap-fastening connection.

After the joining, the indexing pins 60 are removed to unfix the relative movement of the first slide wire 24 with respect to the first conduit section 22 and the relative movement of the second slide wire 28 with respect to the second conduit section 26 is thereby unfixed. After the aforesaid fixing, joining and unfixing, the first and second slide wires 24,28 are movable together within the continuous conduit formed from the first and second conduit sections 22,26. The relative movement of the first and second slide wires 24,28 of the first and second embodiments, both affixed and unfixed, is axial. The relative movement of the first and second slide wires 24,28 of the third embodiment both affixed and unfixed, is axial and rotational.

While the best mode for carrying out the invention has been described in detail, those familiar with the art to which this invention relates will recognize alternative ways of practicing the invention a defined by the following claims.

What is claimed is:

1. A cable-joining assembly for joining push-pull and torsional cables preferably by a hand assembly operation comprising:
   a first conduit section including a first slide-wire therein; said first slide-wire being relatively movable with respect to said first conduit section;
   a second conduit section including a second slide wire therein; said second slide wire being relatively movable with respect to said second conduit section; and
   a snap-together mechanism including a sheath member defined by a first inner sheath section being mounted on one conduit section and a second outer sheath section being mounted on the other conduit section; said inner sheath section being connectable to said outer sheath section for joining first and second conduit sections; said snap-together mechanism also including male and female slide wire end fittings movable within said sheath member; one slide wire end fitting affixed to an end of said first slide wire and the other slide wire end fitting affixed to an end of said, second slide wire; said male slide wire end fitting being insertable into and is circumferentially surrounded therein said female slide wire end fitting for connecting said first and second slide wires.

2. An assembly as in claim 1 further including a projection engaging said slide wire end fittings.

3. An assembly as in claim 1 further including a plurality of radially extending projections engaging said slide wire and fittings.

4. An assembly as in claim 1 wherein said male and female slide wire end fittings have interfitting shapes locking said first and second slide wire end fittings against relative rotational movement.

5. An assembly as in claim 1 wherein each sheath section includes clamping means for snap-fastening together said conduit sections.

6. An assembly as in claim 5 wherein one said sheath section includes a generally radially extending flange having an appended aperture therein and the other said sheath section includes an extension portion having a stepped distal end for snap-fastening onto said aperture.

7. A cable-joining assembly for joining push-pull and torsional cables preferably by a hand assembly operation and comprising:
   a first conduit section including a first slide-wire therein operable to transmit a force; said first slide-wire being relatively movable with respect to said first conduit section;
   a second conduit section including a second slide wire therein operable to transmit a force; said second slide wire being relatively movable with respect to said second conduit section; and
   a snap-together mechanism for joining said sections and including a sheath member defined by a first inner sheath section being mounted on one conduit section and a second outer sheath section being mounted on the other conduit section; said inner sheath section being cooperatively insertable within said outer sheath section for joining first and second conduit sections against relative axial movement to form a composite conduit; said snap-together mechanism also including male and female slide wire end fittings movable within said sheath member; one slide wire end fitting affixed to an end of said first slide wire and the other slide wire end fitting affixed to an end of said second slide wire; said male slide wire end fitting being insertable into said female slide wire end fitting and is circumferentially surrounded therein for connecting said first and second slide wires for transmitting a force therebetween when said fittings are moving within said sheath member; said snap-together mechanism further including generally radially extending projections; said projections tending to distend at the end of such insertion for gripping engagement of the slide wire end fittings.

8. An assembly as in claim 7 wherein said radially extending projections are affixed to said male slide wire end fitting.

9. A cable-joining assembly for joining push-pull and torsional cables without the use of tools and comprising:
 a first conduit section including a first slide wire therein operable to transmit a force; said first slide wire being relatively movable with respect to said first conduit section;
 a second conduit section including a second slide wire therein operable to transmit a force; said second slide wire being relatively movable with respect to said second conduit section; and
 a snap-together mechanism for joining said sections and including a sheath member defined by a first inner sheath section being mounted on one conduit section and a second outer sheath section being mounted on the other conduit section; said inner sheath section being cooperatively insertable within said outer sheath section for joining first and second conduit sections against relative axial movement to form a composite conduit; said snap-together mechanism also including male and female slide wire end fittings movable within said sheath member; one slide wire end fitting affixed to an end of said first slide wire and the other slide wire end fitting affixed to an end of said second slide wire; said male slide wire end fitting being insertable into said female slide wire end fitting and is circumferentially surrounded therein for connecting said first and second slide wires for transmitting a force therebetween when said fittings are moving within said sheath member; said snap-together mechanism further including generally radially extending projections; said projections deforming as said male slide wire end fitting is inserted into said female slide wire end fitting for joining said slide wires and tending to distend at the end of such insertion into gripping engagement with said female slide wire end fitting to resist relative axial movement between the male and female end fittings, the force required to withdraw said male slide wire end fitting from said female slide wire end fitting being greater than the force being transmitted between said slide wires.

10. A method for joining together first and second conduit sections having first and second slide wires respectively therein; comprising the steps of:
 affixing the relative movement of the first slide wire with respect to the first conduit;
 affixing the relative movement of the second slide wire with respect to the second conduit;
 joining together the first and second conduit sections;
 simultaneously connecting together the first and second slide wires while said first and second conduit sections are being joined within said conduit sections;
 unfixing the relative movement of the first slide wire with respect to said first conduit; and
 unfixing the relative movement of the second slide wire with respect to said second conduit, whereby said first and second slide wires are movable together.

11. The method of claim 10 wherein the relative movement affixed and unfixed is axial.

12. The method of claim 10 wherein the relative movement affixed and unfixed is rotational.

13. The method of claim 10 wherein the relative movement is axial and rotational.

14. The method of claim 10 wherein said first and second conduit sections include a first inner sheath section and a second outer sheath section, respectively, which define a sheath member; said first and second slide wires include male and female slide wire end fittings, respectively, and the simultaneous connecting takes place between the sheath sections and slide wire end fittings.

15. The method of claim 14 wherein one of said slide wire end fittings includes a projection which grippingly engages upon connection of the slide wire end fittings.

16. The method of claim 15 wherein said projection is connected to said male slide wire end fitting.

* * * * *